United States Patent [19]

Mazzeo

[11] 4,089,612
[45] May 16, 1978

[54] INTERFERENCE FIT

[75] Inventor: Charles F. Mazzeo, Scotch Plains, N.J.

[73] Assignee: Amerace Corporation, New York, N.Y.

[21] Appl. No.: 755,416

[22] Filed: Dec. 29, 1976

[51] Int. Cl.² ............................................. F16B 2/00
[52] U.S. Cl. .................................. 403/361; 403/359; 403/282
[58] Field of Search ............... 403/359, 282, 361, 298; 279/96, 102; 339/198 H

[56] References Cited

U.S. PATENT DOCUMENTS

| 2,283,905 | 5/1942 | Beal | 16/118 UX |
| 2,708,246 | 5/1955 | Dunn | 403/359 X |
| 3,429,199 | 2/1969 | Kenyon | 403/2 X |

Primary Examiner—Andrew V. Kundrat
Attorney, Agent, or Firm—S. Michael Bender; Ken Richardson

[57] ABSTRACT

An improved cylindrical interference fit for joining and fastening synthetic polymeric material connecting members comprises a smooth surfaced shaft and a complementary internally ridged recess. The shaft, during insertion into the recess, shears away the tips of two spaced longitudinal ridges positioned within an 180° angular segment of the recess and bindingly engages the sheared tips and a portion of the internal surface of the recess thereby forming a three-point interference fit, interlocking joint between the joined members.

9 Claims, 4 Drawing Figures

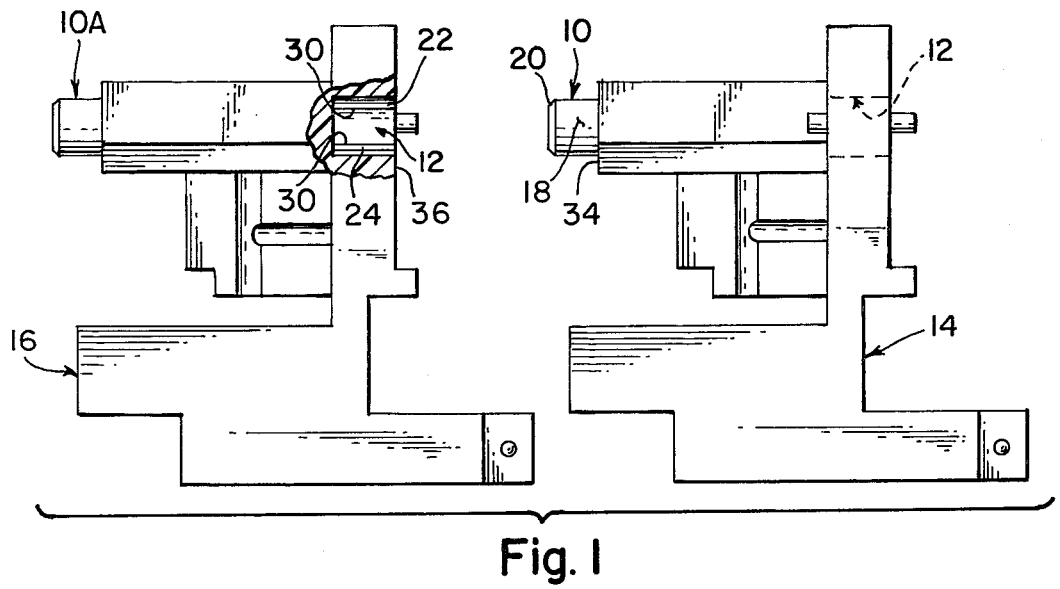
Fig. 1
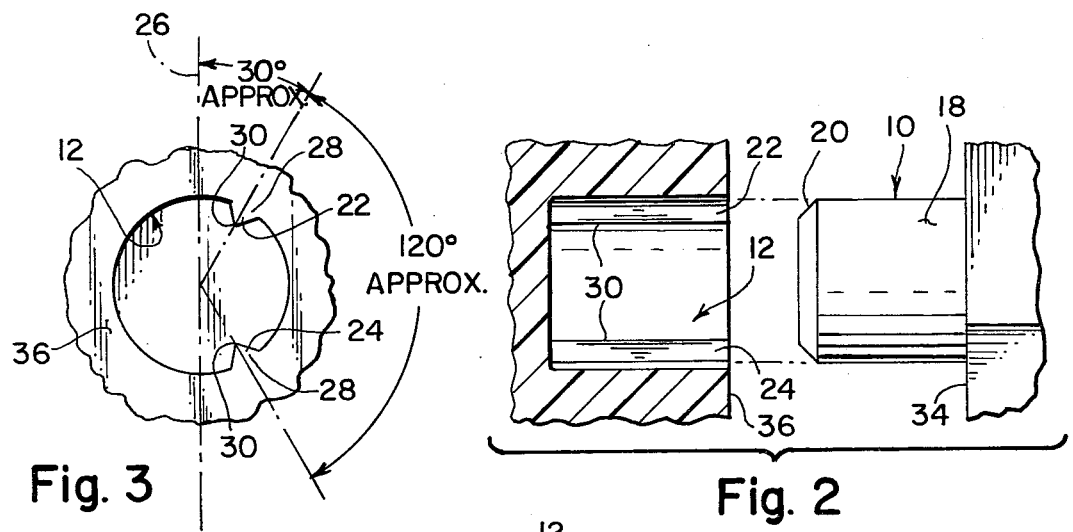
Fig. 3
Fig. 2
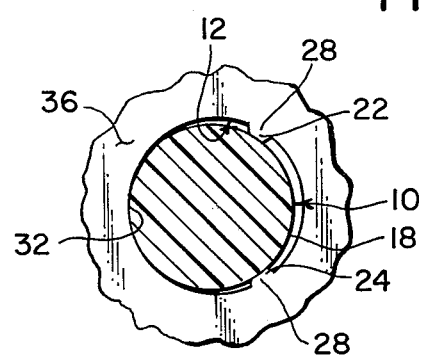
Fig. 4

INTERFERENCE FIT

BACKGROUND OF THE INVENTION

The present invention generally relates to an improved cylindrical interference fit for synthetic polymeric constructed materials, and more particularly, to a smooth surfaced shaft and an internally ridged recess that produces a three-point interference fit useful for fastening together separate interconnecting electrical sectional terminal blocks.

Interconnecting electrical sectional terminal blocks, or plug-in modules, molded from electrically insulating materials such as synthetic polymeric materials, are known and used in which a plurality of separate blocks are fastened or assembled to one another to accommodate a plurality of electrical circuits. General prior art practice in synthetic polymeric materials typically favors cylindrical parts, such as a pin and a mating hole or receptacle to produce a cylindrical interference fit for joining and fastening the blocks into assemblies or circuits. Usually, the classes of interference fits employed for this purpose are either loose fits, i.e., sliding and locational fits, or force fits.

When loose fits in synthetic polymeric materials are utilized, additional fastener components, for example, hardware in the form of bolts, nuts, washers, etc., are frequently necessary to aid in fastening the separate blocks into more or less permanent assemblies. However, the use of additional components has several drawbacks, in that, their use is often costly and may entail tedious time consuming assembly. Moreover, the use of loose fits may also not allow a desired accuracy in locating interconnecting parts associated with the blocks intended to be assembled.

When force fits in synthetic polymeric materials are employed, the external cylindrical surface of the pin is normally constructed to be either smooth or to have multiple serrations thereon. Similarly, the internal circular surfaces of the recesses in synthetic polymeric materials are also constructed to be either smooth or to have a plurality of serrations therein. However, when the surfaces of the pin and hole are both smooth failure often occurs. That is, the pin, hole, or member itself may break or crack during assembly or disassembly due to pressing forces required to produce the force fit with magnitudes too great for the material utilized. Moreover, any misalignment in the interconnecting parts (due to variances in tolerances from the permitted dimensions of these parts required to permit the desired fit) frequently either increase the frequency of failure, or necessitate refitting or remanufacturing the members and/or their related interconnecting parts.

Although practice of constructing the external surfaces of the pins with multiple serrations thereon reduces the occurrence of failure by, in effect, putting lesser amounts of material in interference between parts, and thus diminishing the magnitude of pressing forces, this practice requires additional and often special tooling and/or machining to manufacture the serrated pin.

In some prior art plastic material devices, that utilize multiple serrations within the internal surfaces of the holes, the serrations are often mashed flat during the insertion of a smooth surfaced shaft therein, which in effect, creates an ordinary force fit that is subject to periodic incidences of failure. Further, additional and costly tooling and/or machining is required to construct the serrated recesses.

In yet other prior art devices employing projections or serrations within the recesses, the projections are spring loaded to bring more pressure against complementary grooves on a shaft for receiving the projections or the serrations on the internal surfaces of the holes, or, the serrations are helically shaped and adapted to be received in complementary helical grooves on the shaft. But both these devices are obviously complex in nature, require additional tooling and machining, and are costly to manufacture.

The improved cylindrical interference fit of the present invention, however, has several advantages over earlier fits for synthetic polymeric materials, in that a satisfactory three-point cylindrical force fit interlocking joint is surprisingly and unexpectedly effected with a smooth surface shaft and a recess having therein only two spaced, longitudinal ridges positioned within a 180° angular segment of the recess, by which: a semi-permanent assembly free from accidental or undesirable separation is made possible; material costs and tooling are reduced; undesirable and harmful pressing forces which cause failure are substantially reduced; a need for additional hardware is altogether eliminated; and misalignment resulting from improper manufacturing tolerances of cylindrical interconnecting parts is substantially reduced.

Against the foregoing background, it is an object of this invention to provide an improved cylindrical interference fit for members molded from synthetic polymeric materials.

It is another object of this invention to provide three point cylindrical force fit interlocking joint which joint is of sufficient strength to hold synthetic polymeric constructed connecting members in self-sustaining assembly without allowing accidental or undesirable separation thereof and without a need for additional fastener components.

It is still an object of this invention to provide an improved three-point cylindrical force fit for synthetic polymeric material application while permitting optimum manufacturing economy.

It is a further object of this invention to provide an improved three-point cylindrical force fit for synthetic polymeric materials that substantially eliminates a need for refitting or remanufacturing of the intermating shaft, recess, or members themselves due to misalignments and improper tolerances.

It is yet another object of this invention to provide an improved three-point cylindrical force fit that freely permits simplified snap-on and snap-apart assembly and disassembly of interconnecting electrical terminal sectional blocks.

It is still a further object of this invention to provide a smooth surfaced shaft and ridged recesses for establishing a three-point cylindrical force fit interlocking joint for fastening a plurality of interconnecting synthetic polymeric constructed separate electrical terminal sectional blocks in a more or less permanent assembly of multiple electrical circuits without causing failure of the blocks during their assembly or disassembly.

SUMMARY OF THE INVENTION

To the accomplishment of the foregoing objects and advantages, the present invention in brief summary comprises an improved cylindrical interference fit having an improved shaft and recess for fastening members molded from a synthetic polymeric material selected from the group consisting of nylon, polypropylene and phenolic materials. The shaft comprises a smooth surfaced cylindrical projection, hub, or pin molded integrally with the member; and, in a broad sense, has a diameter smaller than the diameter of a mating or complementary recess of the member in which the shaft is adapted to be therein inserted. The recess of the member comprises a cylindrical hole or opening and has therein two spaced longitudinal ridges positioned within a 180° angular internal circumferential segment of the recess.

When assembling connecting members, moderate force is required to insert the shaft of its associated member into the complementary recess associated with the member to be attached thereto. During insertion, the shaft shears off a thin portion of the material of each longitudinal ridge at its tip: by which, a three-point force fit interlocking joint is formed between the shaft bindingly engaging the two ridges at the sheared tips and a circular internal portion of the surface of the recess.

The effect of the three-point force fit is broadly speaking, to suspend the shaft within the seat of the recess at three points, that is, the two ridges and the portion of the recess wall in contact with the shaft. This allows the shaft to be freely and easily inserted or withdrawn from the recess while either forming or taking apart the joint formed through the fit. The fit is of sufficient strength to hold the interconnected members in self-sustaining interlocked assembly without accidental or undesirable separation thereof, and without a need for additional fastener components.

In one preferred application of this invention, the improved fit provides a simplified snap-on assembly technique to fasten interconnecting electrical terminal sectional blocks in a more or less permanent assembly of circuits, in that, the assembly is free from accidental or undesirable separation. Likewise, the fit provides a simplified snap-apart disassembly technique to unfasten previously assembled blocks.

BRIEF DESCRIPTION OF THE DRAWINGS

The foregoing and still other objects and advantages of the present invention will be more apparent from the following detailed explanation of the preferred embodiments of the invention in connection with the accompanying drawings wherein:

FIG. 1 is a view in elevation of two synthetic polymeric molded interconnecting electrical terminal sectional blocks which are capable of being semi-permanently assembled together in an interfitting complementary manner employing the improved cylindrical interference fit of the present invention;

FIG. 2 is an enlarged, fragmentary view (partly in section) of the shaft and the complementary internally ridged recess disposed respectively on each of the terminal sectional blocks of FIG. 1;

FIG. 3 is an enlarged, fragmentary end view of the internally ridged recess of FIG. 2, and FIG. 4 is an enlarged, fragmentary end view of the internally ridged recess and a sectional view of the pin of FIG. 2.

DETAILED EXPLANATION OF THE PREFERRED EMBODIMENTS OF THE INVENTION

Referring to FIGS. 1-3, a generally cylindrically shaped, projecting pin or shaft 10 and its complementary mating, internally ridged, hole or recess 12 respectively comprise the chief elements of an improved cylindrical interference fit for fastening or interlocking together separate electrical sectional terminal blocks or modules 14, 16. As well known in the art, the terminal blocks 14, 16 are each integrally formed as by molding from a suitable synthetic polymeric material such as, for example, nylon, polypropylene or phenolic. Thus, it will be appreciated that the term "synthetic polymeric material" as used herein and in the appended claims is to be construed to cover both thermoplastic and thermoset plastic materials. Electrical sectional terminal blocks of the type contemplated herein are more fully disclosed in U.S. Pat. No. 2,981,923, which patent is incorporated herein by this reference.

As shown in FIG. 1, terminal block 14 includes a first projecting pin 10 adapted for interlocking mating engagement with a first recess 12 in terminal block 16. Terminal block 14 also preferably includes a second recess 12A identical to first recess 12 for receiving a second pin (not shown) on a third terminal block (not shown) which second pin is identical to first pin 10; whereas terminal block 16 perferably includes still a third pin 10A identical to pin 10 for interlocking engagement with a third recess (not shown) identical to recess 12 on a fourth terminal block (not shown). Although both a pin 10, 10A and a recess 12A, 12 are shown on each terminal block 14, 16 respectively in FIG. 1, it will be understood that each separate terminal block 14 and 16 may include either a single pin without a recess or alternatively, a single recess without a pin. In another variation, each separate terminal block may also include only one pin and a plurality of recesses, or a single recess and a plurality of pins. Still further, each separate terminal block may include a plurality of both pins and recesses.

Pin 10 has an external surface 18 which is generally cylindrically shaped and smooth, and is preferably chamfered at its free end as at 20. The outer diameter of pin 10 is less than the inside diameter of recess 12 as will be explained in greater detail below.

Recess 12 has therein first and second circumferentially spaced longitudinal ridges 22, 24 which ridges 22, 24 extend substantially along the full axial extent of recess 12 and are positioned within a 180° angular segment of the recess substantially as shown in FIGS. 2 and 3. In the preferred embodiment, the first ridge 22 is circumferentially spaced approximately 30° from the vertical centerline 26 or at the one o'clock position as viewed in FIG. 3, whereas the second ridge 24 is circumferentially spaced 120° apart from the first ridge 22 or at the five o'clock position as viewed in FIG. 3. In transverse cross-section, each ridge 22, 24 generally has a triangular shape and is wider or has more material at its base 28 where ridge 22, 24 is attached integrally to the internal wall surface defining recess 12 than it has at its apex 30.

During insertion of pin 10 into recess 12 to produce a cylindrical interference fit in accordance with the present invention, the thinner sections of material at the apex 30 of each ridge 22, 24 are adapted to be sheared off or broken away when engaged by the entering pin 10 with only moderate amounts of assembly pressure or pressing forces applied thereto. Consequently, upon completion of insertion, the pin 10 will be interlockingly engaged between each axially sheared ridge 22, 24 and a circumferential portion of the recess in the 180° portion thereof other than the aforementioned 180° portion in which the first and second ridges 22, 24 are disposed as shown most clearly in FIG. 4, thereby producing a three-point press-fit interlocking joint between the pin 10 and the internal wall surface of the terminal block defining recess 12.

The interlocking fit of pin 10 within recess 12 permits these parts to be freely assembled or taken apart without causing damage to the connecting members or the cylindrical components forming the fit. Moreover, the joint formed by the fit is of sufficient strength to establish semi-permanent assemblies of the joined members, in a sense that the members are free from accidental or undesirable separation and the use of additional fastener components is not necessary.

In the preferred application for the improved cylindrical interference fit, pins 10, 10A and recesses 12A, 12 respectively, are formed integrally with the applicable blocks, 14, 16 to provide three-point force fit for fastening the blocks 14, 16 into a semi-permanent assembly of multiple electrical terminal blocks. To effect assembly, blocks 14 and 16 are juxtaposed until pin 10 is aligned for entry into recess 12. The two separate blocks 14 and 16 are then simply snapped together. That is, block 14 is pressed into block 16 until surface 34 of block 14 engages surface 36 of block 16. As is known, the overall dimension of all surfaces interlocking on both blocks have tolerances to permit the locating, fitting and assembly of the blocks together. With regard to the relative dimensions of the pin 10 and the recess 12, a preferred embodiment of the present invention in the form of medium duty sectionalized terminal blocks molded from a phenolic material and having a 300 volt UL rating include a recess 12 which is 0.25 inches deep with respect to surface 36, has an inside diameter of 0.135 inches, and the axially extending ridges 22, 24 each having a height of 0.012 inches. The complementary mating pin 10 has an outside mating diameter of 0.130 inches and has an axial extent or length with respect to surface 34 of 0.094 inches with a 0.032 inch 45° chamfer at its free end.

Additional blocks, not here shown, may be added to the assembled circuit above by simply adding additional blocks thereto in the manner in which block 14 was interlocked onto block 16. Disassembly of the blocks 14 and 16 is the reverse procedure of the above assembling steps.

As a consequence of the three-point interlocking force fit of the invention, no damage is caused to the pin 10, recess 12, or blocks 14 and 16 during their assembly or disassembly other than the desired shearing off of the tips of ridges 22, 24. Moreover, the assembly and disassembly of the blocks 14 and 16 may be effected by a simple snap-on or snap-apart technique, although the joint formed by the fit is of enough strength to hold the interconnected blocks in self-sustaining interlocked assembly without need for additional fastener components and without allowing accidental separation of the fastened members.

Having thus described the improved cylindrical interference fit of the present invention with particular reference to the preferred forms thereof, it will be obvious that various changes and modifications may be made therein without departing from the spirit and scope of the invention as defined in the specification and appended claims.

Wherefore I claim:

1. An improved interference fit between a substantially cylindrical shaped shaft and a substantially cylindrical shaped recess for fastening separate members together constructed from synthetic polymeric material, wherein the improvement comprises first and second spaced longitudinal ridges formed on an internal cylindrical surface of said recess, said first and second ridges being positioned within a 180° angular segment of said surface, said shaft engaging each of said ridges and a different segment of said cylindrical surface upon inserting said shaft in said recess, said inserted shaft being proportioned relative to said recess to be both suspended and seized within said recess at solely three points comprising each said ridge and said different segment with an interference fit between said shaft and said three points within said recess.

2. The improved interference fit as recited in claim 1, wherein each said ridge includes a longitudinally extending apex, said apex being adapted to be sheared off during said insertion.

3. The improved interference fit as recited in claim 2, wherein said three-point force fit enables a simplified snap-on and snap-apart procedure to respectively assemble and disassemble said members without causing failure to said shaft, recess, or portions of said members during a forming and releasing of said joint.

4. The improved interference fit as recited in claim 1, wherein said first ridge is spaced about 30° from an imagined center line of said recess, and the other ridge is spaced at an angle of approximately 120° from said first ridge.

5. The improved interference fit as recited in claim 4, wherein said shaft engages said recess in said different segment thereof located approximately 120° from said first or second ridge.

6. The improved interference fit as recited in claim 5, wherein said recess is molded integrally within said members.

7. The improved interference fit as recited in claim 1, wherein said shaft comprises a smooth external surface.

8. The improved interference fit as recited in claim 7, wherein said shaft is molded integrally from said member and includes chamfer at its free end.

9. The improved interference fit as recited in claim 8, wherein each said separate member is an interconnecting electrical sectional terminal block molded from said synthetic polymeric material selected from the group consisting of: nylon, polypropylene, and phenolic.

* * * * *